United States Patent [19]

Childers et al.

[11] 4,454,961

[45] Jun. 19, 1984

[54] PACKAGE DISPENSING MECHANISM FOR VENDING MACHINE

[75] Inventors: Spencer L. Childers; Herman R. Craven, both of Fresno, Calif.

[73] Assignee: The Vendo Company, Fresno, Calif.

[21] Appl. No.: 444,744

[22] Filed: Nov. 26, 1982

[51] Int. Cl.³ .............................................. B65G 59/06

[52] U.S. Cl. ...................................... 221/266; 221/298

[58] Field of Search ................. 221/67, 124, 298, 114, 221/118, 93, 251, 266, 25, 289, 123

[56] References Cited

U.S. PATENT DOCUMENTS 3,231,129 4/1963 Craven et al. .

3,799,293 3/1974 Baxendale .

*Primary Examiner*—Stanley H. Tollberg

*Attorney, Agent, or Firm*—Huebner & Worrel

[57] ABSTRACT

A package dispensing mechanism for a vending machine, the mechanism being particularly adapted for dispensing cylindrical packages in a single column, of a single or a multiple depth stack. The mechanism has a cylindrical bucket open at one side and mounted for oscillation substantially about its axis, the bucket having one axially extending edge which simultaneously releases all of the packages in the lowermost tier of such a stack into the bucket and another such edge which sequentially vends the packages so received, and the mechanism has a pivoting gate disposable to support the next tier above such lowermost tier so that such one edge does not engage the such next tier, avoiding lifting of the entire stack even though the bucket and package have substantially different diameters, minimizing the power required to drive the bucket, and avoiding damage to such next tier.

11 Claims, 10 Drawing Figures

PACKAGE DISPENSING MECHANISM FOR VENDING MACHINE

BACKGROUND OF THE INVENTION

1. Field of the Invention

The present invention relates to a package dispensing mechanism for a vending machine, and more particularly to such a mechanism individual to one column of such a machine for dispensing from the column cylindrical packages one at a time.

2. Description of the Prior Art

Machines for vending generally cylindrical packages, such as cans or bottles, from a stack thereof in which the packages are stored in vertical engagement with their axes extended substantially horizontally and in parallel relation are well known. In one well-known arrangement, termed "single column", packages to be dispensed are disposed with their axes substantially in the same vertical plane, as opposed to a "staggered column" in which the axes of alternate engaging packages are somewhat offset horizontally from such a plane. Each stack is associated with a dispensing mechanism at the bottom of the stack to receive the packages gravitationally therefrom. The mechanism is activated, as by a coin actuated control system, to dispense the lowermost package from the stack. It is also well known to provide such vending machines having "multiple depth stacks" in which two or more packages are disposed in end-to-end relation with their axes substantially aligned coaxially and horizontally in a "tier", a number of such tiers being stacked in vertical engagement. In a machine having a multiple depth stack the dispensing mechanism associated therewith typically receives simultaneously from the stack all of the packages in the lowermost tier and then dispenses the packages received from this tier individually upon successive initiations by the control system. For flexibility and adaptability, it is required that such mechanism be capable of dispensing packages of different diameters.

PRIOR ART STATEMENT

The following patents, copies of which are enclosed together with Form PTO-1449, are submitted in conformance with 37 C.F.R. ∫1.97 and ∫1.98 and characterize, together with the prior art described above and in the following "Detailed Description of the Prior Art", the closest prior art of which the applicant is aware.

Craven et al; 3,231,129; Jan. 25, 1966;

Baxendale; 3,799,393; Mar. 26, 1974.

These patents are believed relevant in their disclosure of package vending mechanisms having an element for supporting a stack of cylindrical packages upwardly of a device of the mechanism for releasing a package received from the stack and previously the lowermost package therein and of arrangements for operating such element and device.

U.S. Pat. No. 3,231,129, in FIGS. 9 through 12, discloses such an element, identified by the numeral 642, and discloses such a device which includes the retainers 558 and 560. The retainers are operated by an arrangement which is best shown in FIGS. 2, 3, and 5 and includes a slotted operating arm 86.

U.S. Pat. No. 3,799,397, as best shown in FIGS. 12 through 15, discloses such elements which are identified by the numerals 156 and 158, and discloses such a device which oscillates and includes the movable components 188 and 190 pivoted at 208. One or the other of the elements 156 and 158 support the stack of packages at all times so that no package engages the oscillating device until released from the stack. These elements and this device are actuated by an arrangement, best shown in FIGS. 1, 6, 9, 10, and 12 through 15, having a rotationally driven disc 112 connected by a link 134 to a cam 144 which oscillates with the device. The disc rotates with cam notches 118, 120, 122, and 124 which are disposed to actuate a switch 126 at appropriate times during rotation of the disc so that the elements and device dispense packages from a double-depth stack.

SUMMARY OF THE INVENTION

It is an object of the present invention to provide an improved package dispensing mechanism.

Another object is to provide such a mechanism requiring minimal power for operation.

Another object is to provide such a mechanism which dispenses, without adjustment and without jamming, cylindrical packages of a relatively wide range of diameters.

Another object is to provide such a mechanism particularly adapted to dispense cylindrical packages from a single column stack thereof, the stack being of single or multiple depth.

Another object is to provide such a mechanism which is adapted to dispense packages from a double-depth stack thereof without jamming.

Another object is to provide such a mechanism which will not damage cylindrical packages having a relatively weak or soft periphery.

Another object is to provide such a mechanism adapted for use in existing multiple column vending machines and control systems thereof and for use in future such machines and systems.

Another object is to provide such a mechanism which will not operate improperly even when, in a column provided with the mechanism, a package falls substantially the entire vertical height of the column during loading thereof.

A further object is to provide improved elements and arrangements thereof in such a mechanism which is rugged, dependable, economical to manufacture and maintain, durable, and fully effective in performing its intended purposes.

BRIEF DESCRIPTION OF THE DRAWINGS

In FIGS. 2A and 2B are shown, respectively, the dispensing and the receiving of packages from a tier of the stack. FIG. 2C is taken from the position of line 2C—2C in FIG. 2B and shows a jammed stack condition occurring with the prior art mechanism.

DETAILED DESCRIPTION OF THE PRIOR ART

Figure 1:
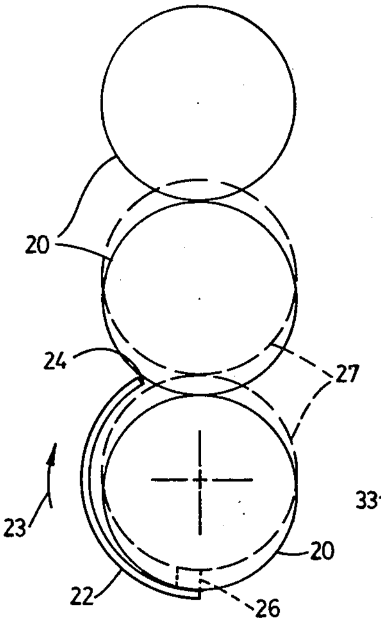
FIG. 1 PRIOR ART
FIG. 1 is a schematic representation of a bucket of a prior art package dispensing mechanism and a stack of packages, a modified structure of the bucket and resulting package positions being depicted in dash lines.

A prior art dispensing mechanism for use with a single column vending machine having a stack of packages 20 is schematically represented in FIG. 1. The mechanism has an arcuate bucket 22 which extends approximately about one-half of a cylindrical surface having its axis parallel to the axes of the packages. The bucket moves in the direction indicated by the arrow 23 to separate the lowermost package from the stack. The internal diameter of the bucket is substantially larger than the exterior diameter of the packages since the mechanism is adapted to dispense packages of such larger diameter. However, as is often the case, the mechanism is being used with smaller diameter packages. The bucket is depicted at a point in its movement wherein its leading edge 24 is about to engage the second package from the bottom to "cut off" the stack leaving the lowermost package in the bucket for dispensing downwardly when the bucket is subsequently moved so that its open side is downwardly disposed. It is evident that the second package and all the packages thereabove must be lifted as movement of the bucket continues from the position shown in FIG. 1. As a result, a relatively large and expensive motor is required to power rotation of the bucket. It is also evident that, if packages substantially smaller in diameter than the bucket are provided thereto, there is a tendency for the bucket to jam against the second package and disable operation of the column until serviced manually. To alleviate this difficulty it is known to modify the bucket by adding an internal projection 26 dimensioned and disposed so that the upper portion of smaller diameter packages is more nearly at the elevation of the leading edge when the bucket is disposed as shown in FIG. 1, the packages then having the positions 27 depicted in dash lines. It is evident that the ability of the bucket to receive larger diameter packages is thereby reduced with the likelihood of a jam as the larger diameter package is received in the bucket or is cut off from the stack. The bucket may be provided with a variety of such projections which are detachable so that the proper projection may be used with each diameter of package. However, this is an undesirable complication at best, it being preferred that a vending machine be usable with different diameter packages without major adjustment.

It will also be noted from FIG. 1 that engagement of the leading edge 24 with the package immediately upwardly of the bucket 22 rubs against this package or even tends to pierce it if the package is not of the exact diameter for which the bucket and the projection 26 are adapted. As a result, the prior art dispensing mechanism of FIG. 1 tends to damage packages which are not of relative strong construction, and, in particular, often peels the plastic coating from bottles coated therewith.

Figure 2A:
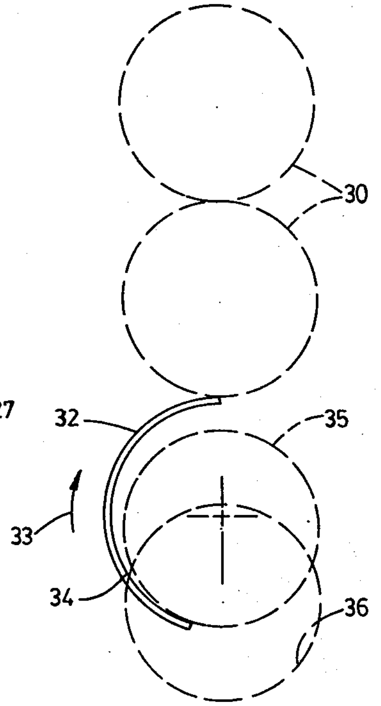
FIG. 2A PRIOR ART
FIGS. 2A, 2B, and 2C are schematic representations of a prior art package dispensing mechanism similar to that in FIG. 1 and used with a "double-depth" stack of packages.
Figure 2B:
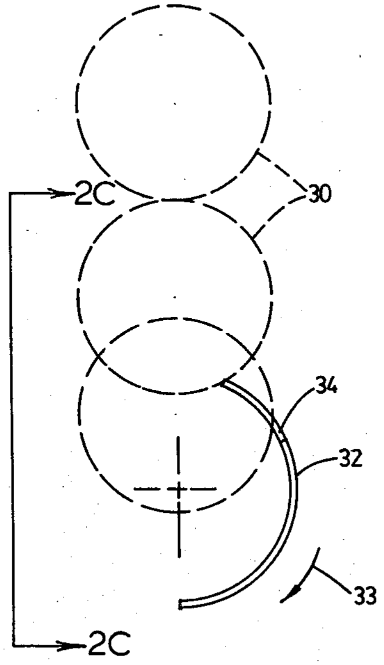
FIG. 2B PRIOR ART
Figure 2C:
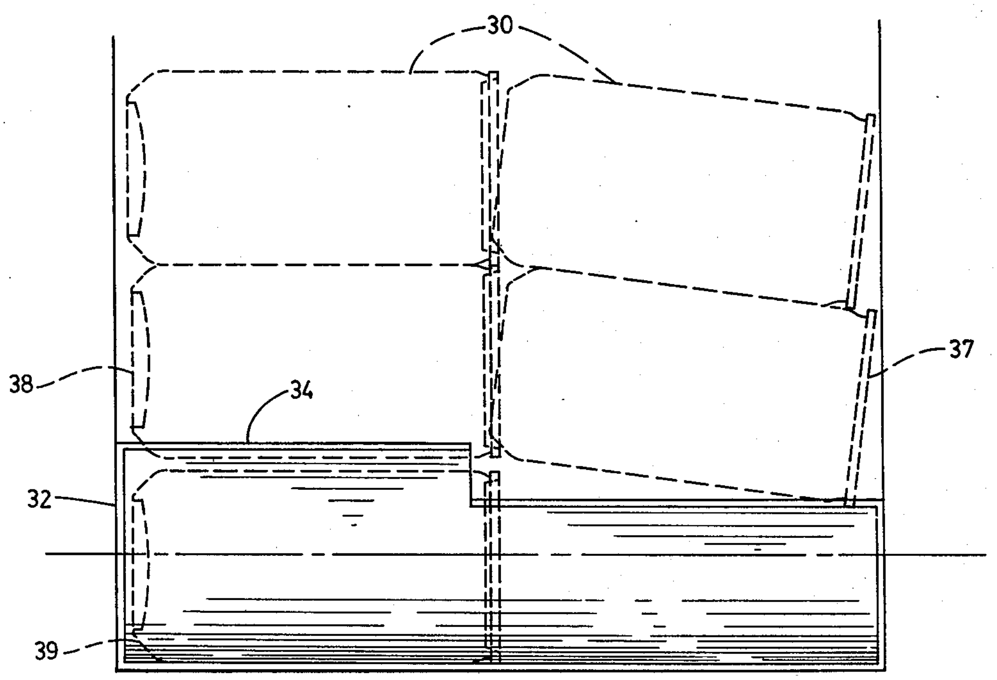
FIG. 2C PRIOR ART

In FIGS. 2A through 2C, a prior art dispensing mechanism for a "double-depth" stack of packages 30 is depicted. The mechanism has a bucket 32 which is structurally and functionally similar to the bucket 22 and which rotates through an entire revolution in the direction indicated by the arrows 33 to separate one tier of packages from the stack and vend them individually. The bucket has a lip 34 extended from its trailing edge in vertical alignment with one of the packages in each tier. In FIG. 2A the bucket is depicted in a position in its rotation in which such one package 35 of a tier is retained in the bucket by the lip while the other package 36 is vended. In FIG. 2B, the bucket is depicted at a point in its rotation where such one package is being received into the bucket while the corresponding such other package is retained upwardly in the stack by the lip for subsequent release into the bucket. The prior art mechanism provides successive reception of the packages into the bucket although such reception serves no purpose at this time and frequently results in a jam, as depicted in FIG. 2C, due to engagement of the second package 37 to be received in the bucket from each tier with the package 38 of the next tier above the already received package 39.

DESCRIPTION OF THE PREFERRED EMBODIMENT

Figure 3:
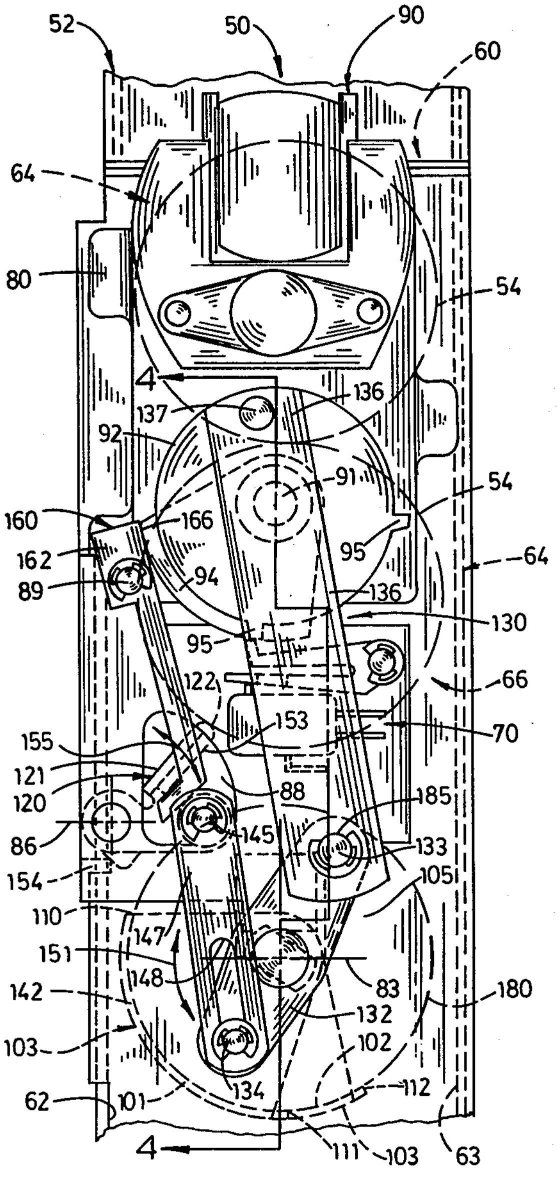
FIG. 3 is a front elevation of the package dispensing mechanism which embodies the principles of the present invention in a representative operating environment including a fragmentary represented vending machine and a plurality of packages to be dispensed, the mechanism being in an initial disposition.
Figure 4:
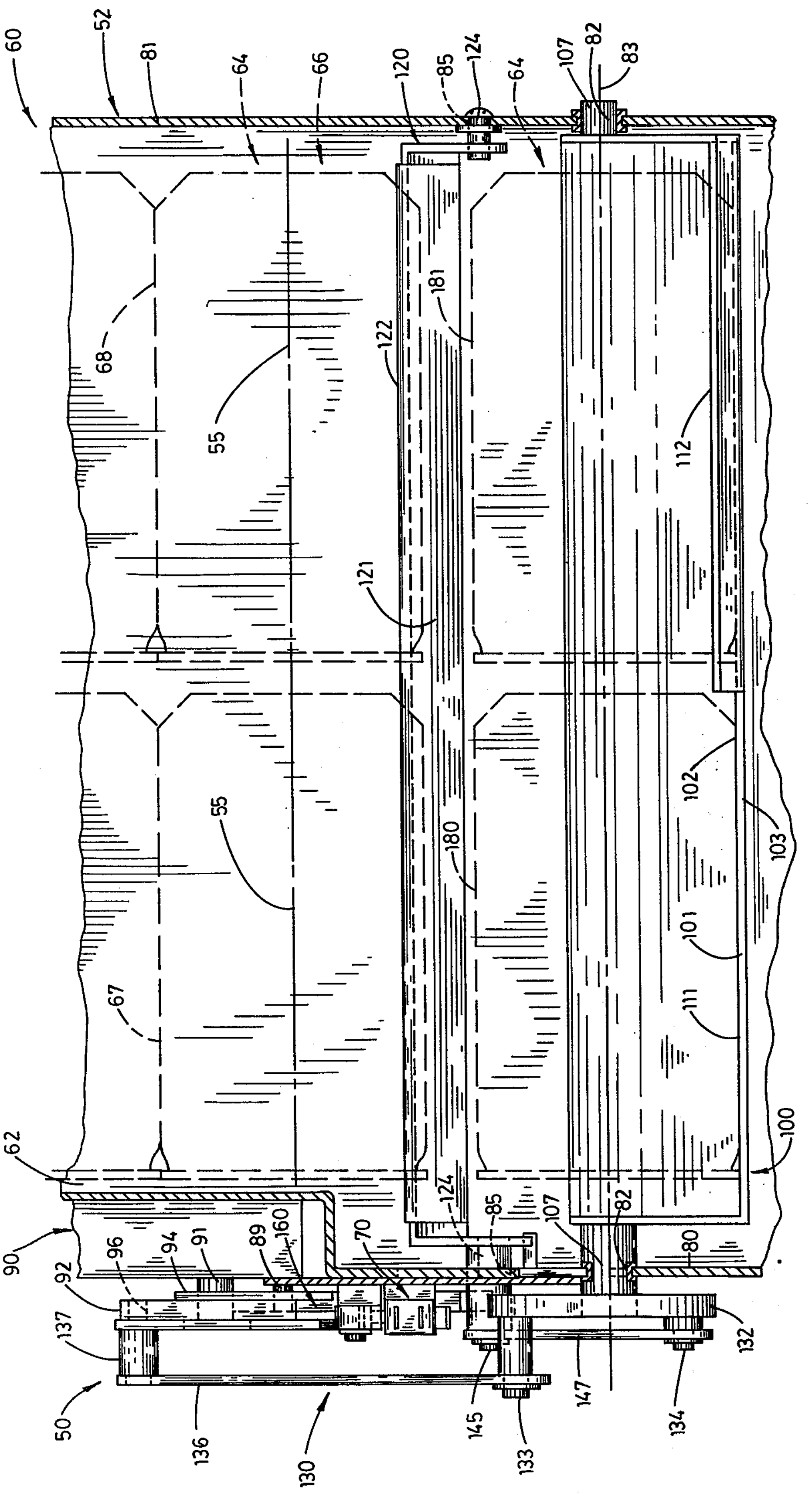
FIG. 4 is a section of the mechanism and environment taken on line 4—4 of FIG. 3.

Referring with greater particularity to the drawings, in FIGS. 3 and 4 is shown a package dispensing mechanism 50 which embodies the principles of the subject invention and is for use with a fragmentarily represented vending machine 52 to dispense sequentially therefrom a plurality of packages 54. The packages are depicted as cylindrical cans which have a predetermined diameter, radius, and length of the largest size for which the mechanism is adapted. It is evident that the diameter of the packages is a predetermined width thereof and that the packages each have a central, longitudinally extended axis 55. Although the packages to be dispensed or vended by the mechanism of the present invention and parts of said mechanism are frequently referred to herein for convenience as "cylindrical", it is intended that such term be broadly construed to encompass all packages and parts circumscribed by a surface of revolution. The mechanism is, therefore, adapted to dispense any generally cylindrical package having a relatively rigid peripheral or exterior surface such as cans having a relatively smaller diameter than the depicted packages and such as bottles, including bottles having a plastic coating.

The vending machine 52 is representative of vending machines in which the packages 54 are stored in a single-column stack 60 in vertically engaging relation with their axes 55 extending substantially along a common vertical plane. The stack is confined between a pair of parallel, planar, and substantially coextensive walls 62 and 63 of the machine. The wall 62 is depicted as being to the left of FIGS. 3, 4, and 5A through 5D, the wall 63 being depicted to the right of these figures. The walls are spaced a distance somewhat greater than the diameter of the packages. The stack has a plurality of tiers 64 each having two of the packages juxtapositioned in end-to-end relation with their axes substantially coincident. The stack has a lowermost tier position 66 which is at a predetermined elevation and toward which the tiers of packages gravitate. The stack is a doubledepth stack, composed of two sub-stacks extending individually upwardly from two packages 67 and 68 which occupy the lowermost tier position and are depicted as being, respectively, toward the left and toward the right of FIG. 4. It will subsequently be apparent that a mechanism embodying the principles of the subject invention is applicable to a vending machine having a similar stack having only one package in a tier or having three or more packages in a tier. The mechanism is also usuable with a vending machine in which such packages are stored in a stack having a staggered column so long as the packages at the lowermost tier position of the stack are in a single column.

Figure 5A:
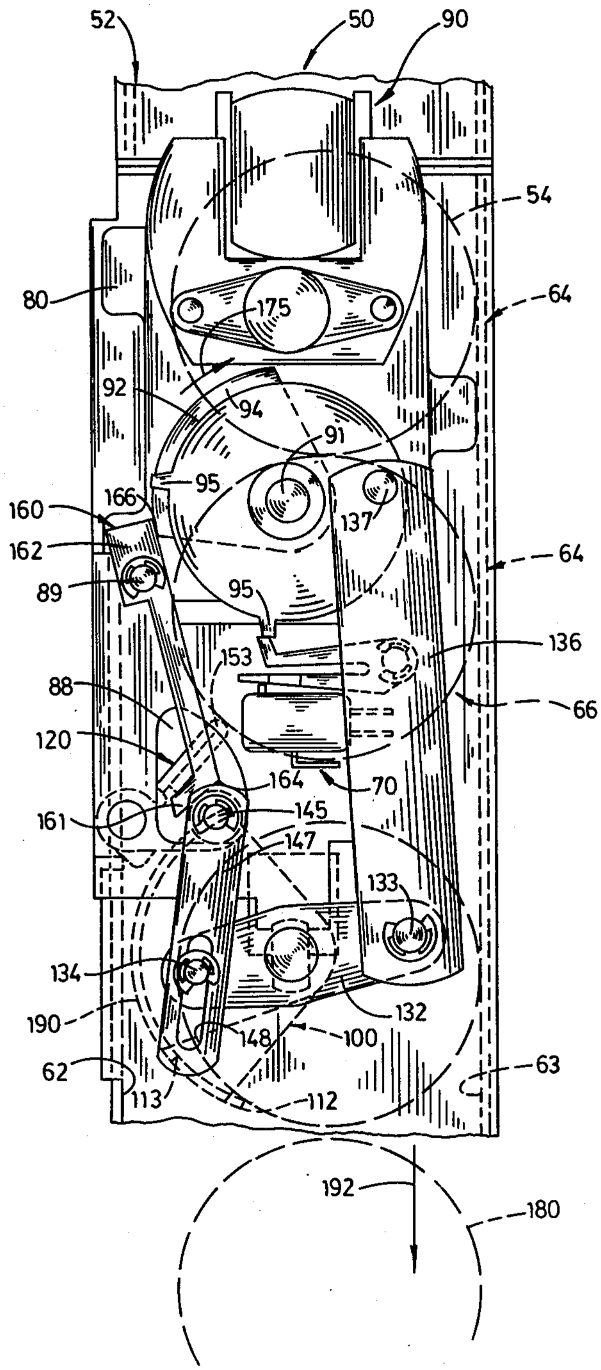
FIGS. 5A through 5D are elevations of the mechanism, similar to FIG. 3 but with various portions of the mechanism and the environment omitted for clarity, depicting sequential dispositions of the mechanism during a vending cycle between successive such initial dispositions.

A mechanism similar to the mechanism 50 is usable with vending machines of a variety of constructions so long as the machine structure set forth above is present. As a result, the specific structure of the balance of the machine is not further described herein. Typical vending machines, although of the staggered stack variety, are shown in the above U.S. Pat. Nos. 3,231,129 and 3,799,393 referred to in the Prior Art Statement herein. It is well known to utilize vending machines having elements, such as those of an electric control system, for initiating operation of a dispensing mechanism when an individual package is to be dispensed upon deposit of the purchase price thereof. Such a control system serves successively to initiate the operation of a dispensing mechanism associated with a stack such as the stack 60. A typical such system, which may be utilized with the mechanism 50, is disclosed in U.S. Pat. No. 3,844,394 to Hale et al. Such a system typically has a switch, such as the electric switch 70 of the machine 52 which is shown in FIGS. 3 and 5A and which corresponds to the "motor carrier" switch identified in such patent by the numeral 66.

The dispensing mechanism 50 has a pair of upright end plates 80 and 81 extending transversely between the upright walls 62 and 63 and disposed oppositely and outwardly of the lowermost tier position 66. The plate 80 is depicted as being adjacent to the package 67 and the plate 81 as being adjacent to the package 68. The plates are fixedly mounted on the walls in any suitable manner and extend upwardly and downwardly from such tier position a substantial distance. The plates have individual bores 82 aligned along a pivotal bucket axis or plate axis 83 which extends centrally between the upright walls and substantially horizontally beneath the lowermost tier position 66 of the stack 60. The bucket axis is disposed substantially in the common plane of the axes 55 of the packages 54 in the stack 60. The bucket axis is substantially parallel to these package axes and is spaced downwardly from a package in the lowermost tier position a distance somewhat greater than the radius of one of the packages 54 which are depicted as having the largest radius for which the mechanism is adapted. Each end plate has a bore 85 adjacent to the upright wall 62, and these bores are aligned and disposed so as to define a gate pivotal axis 86 which is substantially parallel to the bucket axis and is closely adjacent to the such upright wall. The gate axis is disposed upwardly from the bucket axis approximately such a distance and spaced horizontally therefrom approximately such a distance. The end plate 80 has an opening 88 through it between its bores 82 and 85. A pivot pin 89 extends from the plate 80 parallel to the bucket axis and oppositely of the stack 60, this pin being disposed a substantial distance oppositely of such opening from the bucket axis.

The mechanism 50 has an electric motor unit 90 of wellknown construction mounted on the end plate 80 oppositely of the stack 60 and energizable by a control system which is of the kind previously described and which includes the switch 70 and serves to energize the motor unit to initiate individually the vending of each package 54. The motor unit has an output shaft 91 which rotates through one revolution as the mechanism carries out a cycle resulting from two successive initiations by the control system to dispense sequentially the two of the packages in each tier 64. The output shaft is substantially parallel to the bucket axis 83 and is disposed above it any suitable distance. The switch 70, typically, is fixedly mounted between the shaft and this axis on the plate 80. The output shaft extends from the motor unit oppositely of the stack, as best shown in FIG. 4, and has mounted on it for rotation with it a crank disk 92 of any suitable diameter. The crank disk has, mounted on it for rotation with the output shaft, an arcuate cam lobe 94 and a pair of narrow cam lobes 95. The narrow lobes extend circumferentially of the disk only a few degrees and correspond in number to the number of packages 54 in each tier. These lobes are disposed so that they actuate the switch 70 sequentially during each revolution of the output shaft to deenergize the motor unit. The disk has a bore 96 extended through it near its periphery. This bore is parallel to the shaft axis and is spaced radially therefrom a predetermined distance.

The mechanism 50 has a bucket 100 which is preferably of unitary construction. The bucket has an elongated and transversely arcuate plate or side wall 101 providing a concave inner side or surface 102 and a convex outer side or surface 103. The radius of the concave surface is substantially equal to the radius of a package 54 of the largest diameter for which the mechanism is adapted, so that the convex surface has a somewhat larger radius and so that the radius of the plate is substantially less than the distance between the upright walls 62 and 63. The surfaces are curved about a predetermined axis of the bucket, and the bucket has an open side 105 opposite this axis from the concave surface. The length of the arcuate plate along such axis is somewhat less than the distance between the end plates 80 and 81 and is thus substantially equal to the length of a tier 64 axially of the packages therein. The concave surface thus conforms to the periphery of the two packages in a tier. The bucket has a pair of brackets individual to each end of the arcuate plate and extended therefrom beyond such predetermined axis. Each bracket has a pivot 107 extended from it oppositely of the plate along the predetermined plate axis and adapted for reception in the adjacent one of the bores 82. The bucket is thereby mounted for pivotal movement about the axis 83 so that it and such predetermined bucket axis are substantially coincident. The pivot received in the corresponding bore of the end plate 80 extends substantially beyond this plate in a direction oppositely of the arcuate plate. It is evident that the end plates receive the bucket pivots so as to mount the bucket for oscillating movement about the axis 83, and it is evident that the bucket is disposed beneath the lowermost tier position 66.

The arcuate plate 101 has a linear, longitudinally extending receiving edge 110 which is substantially parallel to the bucket axis. This plate has two linear and longitudinally extending discharging edges 111 and 112 disposed circumferentially oppositely of the plate from the receiving edge and extended substantially parallel thereto. The number of discharging edges is thus equal to the number of packages 54 in a tier 64. The length of each discharging edge is substantially one-half of the length of the receiving edge and is thus generally equal in length to the length of a package. The edge 111 is a first discharging edge which is toward the end plate 80 and thus corresponds to the package 67 and the packages above it in the stack 60. The discharging edge 112 is a second discharging edge and extends, longitudinally of the plate, from the first discharging edge toward the end plate 81 and thus corresponds to the packages 68 and the packages thereabove in the stack. The discharging edges are spaced from the receiving edge substantially different distances in a direction transversely along and circumferentially about the arcuate plate from the receiving edge and, in such a direction, are disposed oppositely of the open side 105 from the receiving edge. For use with a tier of two packages, the first discharging edge, typically, is spaced about 100° circumferentially of the arcuate plate from the receiving edge while the second discharging edge is, typically, spaced about 140° therefrom. It will be apparent that, by providing additional discharging edges which are spaced suitable distances from the receiving edge and which have a length generally equal to the length of a package, a mechanism similar to the mechanism 50 is adapted to tiers having more than two packages.

The mechanism 50 has a gate or blocking shelf 120 disposed at the lowermost tier position 66. The gate has an elongated rectangular blade 121 substantially equal in length to the arcuate plate 101. The blade has a longitudinally extending linear blocking edge or distal edge 122. The gate has a pair of brackets extended individually from the opposite ends of the blade beyond the gate axis 86. The gate has a pair of pivots extended individually from the brackets and received individually in the bores 85 so as to mount the gate for pivotal movement about the gate axis. The brackets are dimensioned so that the distal edge is spaced from the gate axis a distance generally equal to a radius of a package 54. It is evident that the distal edge is substantially parallel to the receiving edge 110 of the bucket 100 and that these edges are aligned in a direction therealong.

The mechanism 50 has a linkage indicated generally by the numeral 130 and powered by the motor unit 90 for motivating the bucket 100 and the gate 120 in oscillating pivotal movement about their respective axes 83 and 86. The linkage has a crank 132 which is mounted on the one of the bucket pivots 107 which extends through the end plate 80 for pivotal movement of this crank with the bucket. The crank extends diametrically across the bucket axis 83 and has a pair of crank pins 133 and 134 which extend parallel to this axis and are disposed diametrically oppositely thereof. The pin 133 is referred to in the claims as a "second crank pin" and the pin 134 is referred to in the claims as a "fourth crank pin". These pins oscillate with the bucket. The linkage has a first connecting rod 136 which has a bore pivotally fitted to the pin 133 and which is provided with a crank pin 137. This pin is referred to in the claims as a "first crank pin" and is received in the bore 96 of the crank disk 92. The pin 133 is spaced from the axis of the output shaft 91 so that, as the crank disk undergoes one revolution, the bucket oscillates between a first extreme position 141, which is substantially the bucket position shown in FIG. 5C, and a second extreme position 142, which is shown in FIG. 3. It is evident that the output shaft, the crank disk, and the crank pin 137 define a crank assembly having a rotational axis substantially parallel to the bucket axis and that this pin rotates through one revolution as the disk rotates through one revolution. It is also apparent that the first connecting rod interconnects the pins 132 and 133.

The linkage 130 has a crank pin 145 mounted on the bracket of the gate 120 adjacent to the end plate 80 for pivotal movement with the gate. This pin is referred to in the claims as a "third crank pin" and extends parallel to the bucket axis and through the opening 88 from such bracket. The linkage has a second connecting rod 147 which interconnects the pins 134 and 145 and has a slot 148 extending between these pins and receiving the latter pin. The pin 134 moves in a path which is adjacent to the gate axis 86 and is indicated by the arrows 151. This pin moves along this path between an upper extreme position of the pin, which corresponds to a feeding position or upper extreme position 152 of the gate 120 shown in FIG. 5C, and a lower extreme position of the pin which corresponds to a blocking position or lower extreme position 152 of the gate shown in FIG. 3. The gate is mounted by its pivots 124 and the end plates 80 and 81 for pivotal movement between its extreme positions. A stop 154 of any suitable construction is mounted on the end plate 80 to engage the gate and limit its downward movement to such lower position. It is evident from FIG. 3 that the crank pin 145 moves with the bucket in a path which is indicated by the arrows 155. This path is substantially beneath the path 151 and has upper and lower extreme positions corresponding respectively to the first extreme position 141 and to the second extreme position 142 of the bucket. It is apparent that the linkage 130 and the motor unit 90 serve as a power drive to motivate the gate and the bucket between their respective extreme positions and through positions therebetween.

The mechanism 50 has a latch lever 160 best shown in FIG. 5A. This lever has a distal end 161 adjacent to the crank pin 145, which moves with the gate 120, and has an opposite end 162 which is mounted directly on the pivot pin 89 for pivotal movement of the distal end toward and from such crank pin. The latch lever is thus mounted indirectly on the upright walls 62 and 63 and extends from the pivot pin in a direction generally oppositely thereof from such crank pin. The distal end provides a cam surface 164 which is disposed to engage the crank pin, when the distal end moves theretoward and when this pin is in the lower extreme position along its path 155, and to latch this pin in such position and to maintain the gate in its blocking position 153. Such opposite end of the latch lever extends from the pivot pin oppositely of the distal end and has a cam surface 166 disposed toward the arcuate cam lobe 94 on the crank disk 92 so that such lobe engages the latch lever to pivot the distal end thereof into engagement with the crank pin. When this lobe is disengaged from the lever, the lever is pivotable from the crank pin releasing the gate for movement from the blocking position.

OPERATION

The operation of the described embodiment of the subject invention is believed clearly apparent and is briefly summarized at this point. The mechanism 50 is powered by the motor unit 90 to undergo a cycle, which corresponds to one revolution of the crank disk 92 in the direction indicated by the arrow 175, upon two successive package vending initiations by a control system of the machine 52. In this cycle, two of the packages 54 previously received in the bucket 100 and rested on the concave surface 102 are sequentially dispensed, and the two packages 67 and 68 in the lowermost tier position 66 are received in the bucket to be dispensed on the immediately following such cycle.

Such cycle is assumed to begin with the elements of the mechanism 50 in an initial disposition shown in FIG. 3. The mechanism is in this disposition preceding the first such initiation. In this disposition, the gate 120 is in its blocking position 153 and the bucket 100 is in its second extreme position 142. Referring to these positions in detail, it is apparent that in the blocking position the blade 121 of the gate extends from the gate axis 86 toward the packages 67 and 68 so that the distal edge 122 engages these packages to block downward movement thereof and to support the stack 60 upwardly of the bucket. Due to the configuration and disposition of the gate, these packages are engaged substantially tangentially by the distal edge facilitating subsequent pivotal movement of the gate from the blocking position toward the feeding position 152 in a direction generally upwardly of the bucket axis 83. It is evident that, in such initial disposition, the distal edge is disposed above the arcuate plate 101 and the gate axis and is disposed centrally between the upright walls 62 and 63. With the bucket in its second position 142, the discharging edges 111 and 112 are also disposed centrally between the upright walls so that two packages 180 and 181 are supported downwardly of the stack 60 and on the concave surface 102. These two packages are the packages of a tier previously received from the lowermost tier position 66, the package 180 being previously in the position occupied by the package 67 and the package 181 being previously in the position of the package 68. It is evident that, when the bucket is in its second position, the discharging edges are spaced downwardly from the bucket axis 83 a distance generally equal to the radius of a package 54, which is of the largest size for which the mechanism is adapted. With the bucket in such position, the receiving edge 110 of the bucket is spaced such a distance horizontally from this axis toward the wall 62 and thus from one side of the common plane in which the axes 55 of the packages in the stack 60 are generally disposed.

When the mechanism 50 is in its initial disposition, the crank pin 134 is in the lower extreme position of its path 151. The arcuate cam lobe 94 is then disposed so as to engage at its leading edge the cam surface 166 of the latch lever 160 so that this lever pivots to block movement of the gate 120 upwardly from its blocking position 153. In such initial disposition, the leading one of the narrow cam lobes 95, which actuates the switch 70, is disposed circumferentially of the disk 92 in relation to the arcuate lobe so that this narrow lobe engages the switch and causes the associated control system to deenergize the motor unit 90. The mechanism 50 thus remains in its initial disposition for the time being. Typically, the other of the narrow lobes is spaced approximately 90° from this one lobe in a direction opposite the direction 175 and the crank pin 137 is disposed somewhat in such opposite direction from a point exactly above the axis of the output shaft 91. The length of the first connecting rod 136 is such that, in the initial disposition of the mechanism 50, the crank pin 133 is in an upper extreme position 185 corresponding to the positions of the bucket 100 and the gate 120 in such initial disposition. When the gate and the bucket are in such positions, the crank 132, which pivots with the bucket, and the second connecting rod 147 draw the crank pin 145 to the lower extreme position along the path 155.

With the mechanism 50 in its initial disposition shown in FIG. 3, the machine 52 provides a first package vending initiation of the motor unit 90 in the cycle of the mechanism. The mechanism is then motivated by the motor unit into a discharging disposition shown in FIG. 5A in which the disk 92 has revolved from its position shown in FIG. 3 until the following one of the narrow cam lobes 95 has engaged the switch 70, resulting in deenergization of the motor unit until a second and final such initiation of the cycle occurs. In such discharging disposition, the bucket is in a first discharging position 190 intermediate of its extreme positions 141 and 142 in which only the discharging edge 111, which is nearer to the receiving edge 110 than the discharging edge 112, is spaced from the upright wall 63 a distance somewhat greater than the diameter of one of the packages 54. As a result, the package 180 is dispensed downwardly from the bucket, as indicated by the arrow 192, between the discharging edge 111 and such upright wall as the bucket moves into its first discharging position. It is apparent that the trailing one of the narrow cam lobes is receptive to movement of the arcuate plate 101 and serves to interrupt the operation of the motor unit 90 as this plate attains a position corresponding to such discharging position of the bucket. As a result, only the package 180 is dispensed by the first such vending initiation, the initiation immediately preceding movement of the bucket into the discharging disposition.

The arcuate cam lobe 14 is configured so that, with the mechanism 50 in such discharging disposition, this lobe remains engaged near its trailing edge, with the cam surface 166 of the latch lever 160. This lever thus maintains the gate 120 in its blocking position 153 prior to the second and final of the vending initiations of a cycle of the mechanism. It is apparent that continued rotation of the crank disk 92 in the direction 175 will disengage the arcuate lobe from the latch lever during the balance of such cycle allowing this lever to pivot from the crank pin 145 to unlatch the gate from its blocking position. In the discharging disposition, the crank pin 134 is disposed downwardly in the slot 148 from the top thereof so that this crank pin remains in its lower extreme position along its path 151. As a result, when the mechanism is in the discharging disposition, the gate and the bucket 100 are in a relative disposition, termed a "first relative disposition" in the claims, in which the bucket is in a discharging position, the position 190, for release of one of the packages 54 previously received in the bucket and in which the gate 120 is in its blocking position. It can be seen from FIG. 5A that, when the bucket is in the discharging position, its receiving edge 110 is spaced upwardly from the bucket axis 83 a distance generally equal to the radius of a package 54 and that the first discharging edge 111 is spaced generally such radius from this axis in a horizontal direction toward the upright wall 62.

When the mechanism 50 is in the discharging disposition just described and the second vending initiation of a cycle is received from the control system of the machine 52, the crank disk 92 rotates in the direction 175 until the leading one of the narrow cam lobes 95 again engages the switch returning the mechanism to its initial disposition shown in FIG. 3. During this rotation, the mechanism passes through a first feeding disposition shown in FIG. 5B in which the receiving edge 110 is disposed centrally between the upright walls 62 and 63 and beneath the lowermost tier position 66. As the mechanism moves from the discharging disposition in FIG. 5A to such first feeding disposition, the crank pin 134 engages the top of the slot 148 urging the crank pin 145 upwardly so that the gate 120 moves from its blocking position 153 toward its feeding position 152. However, in the first feeding disposition this movement is not complete so that the gate edge 122 remains in supporting engagement with the packages 67 and 68.

Figure 5B:
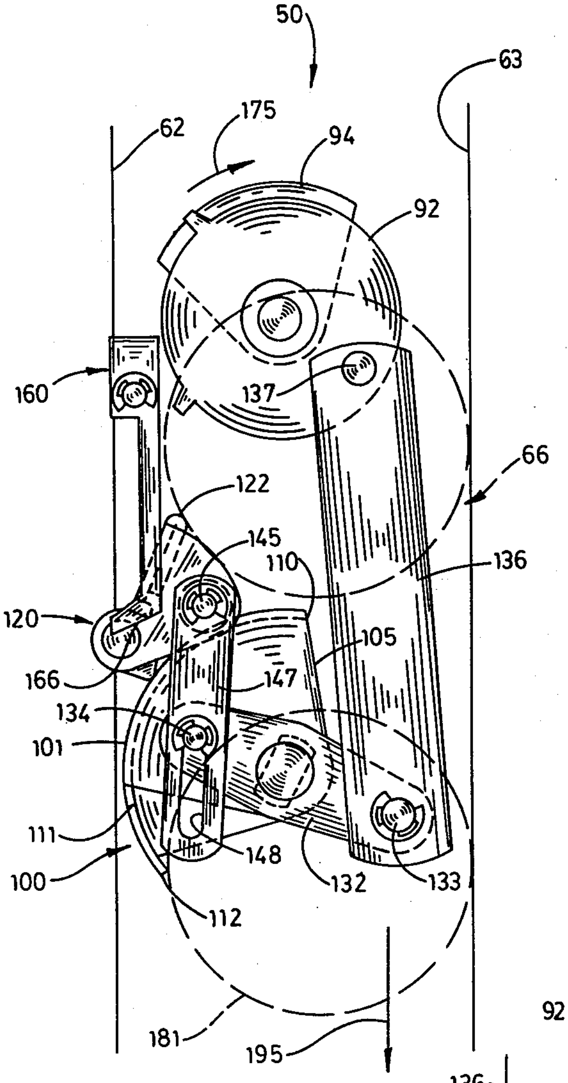

With the mechanism 50, the machine 52, and the packages 54 proportioned and dimensioned as shown in the figures, and with the mechanism in the first feeding disposition shown in FIG. 5B, the second discharging edge 112 of the bucket 100 is spaced from the upright wall 63 a distance greater than the diameter of a package so that the package 181, which has formerly rested in the concave bucket surface 102, is gravitationally dispensed from the arcuate plate 110, as indicated by the arrow 195. It is evident that the positions of this plate shown in FIGS. 5A and 5B are two intermediate positions of the plate along its movement with the bucket 100 in a direction from the bucket position 142 toward the bucket position 143 and it is evident that these intermediate positions correspond individually to the release of the two packages in a tier 64. It is also evident that the motor unit 90 motivates the arcuate plate in such direction so that, as the discharging edges 111 and 112 pass beneath their respectively corresponding packages 180 and 181, these packages are successively gravitationally dispensed from the arcuate plate.

Figure 5C:
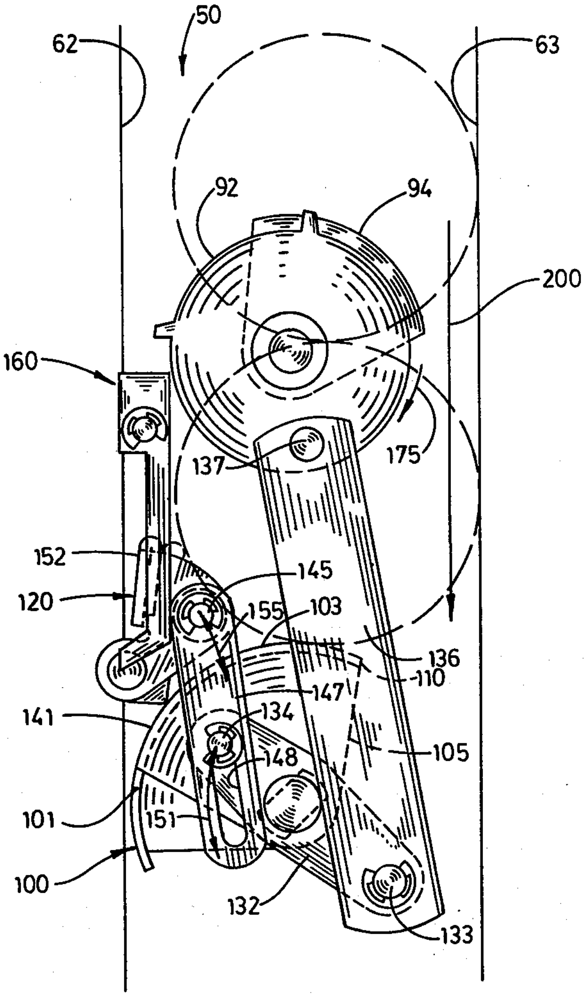

As the disk 92 continues to rotate in the direction 175, the mechanism 50 continues through its cycle from the first feeding disposition shown in FIG. 5B to a second feeding disposition depicted in FIG. 5C. In the latter disposition, the bucket 100 has substantially attained its first extreme position 141 with the receiving edge 110 remaining centrally between the walls 62 and 63 and being spaced upwardly of the bucket a distance generally equal to the radius of a package 54 and with the discharging edges 111 and 112 being spaced such a distance horizontally from the bucket axis toward the upright wall 62. As the mechanism moves from the first feeding disposition toward the second feeding disposition, the second connecting rod 147 urges the crank pin 145 into the upper extreme position along its path 155 as the crank pin 134 attains its upper extreme position along the path 151 and as the bucket attains its first extreme position. It is evident, therefore, that the respective upper extreme positions of the crank pins 134 and 145 correspond to the second feeding disposition of the mechanism. It is also evident that the crank pin 133 has a lower extreme position, shown in FIG. 5C, which corresponds to such second feeding disposition. In this disposition, the gate 120 has been carried into its feeding position 152 by the linkage 130 so that the distal edge 122 is adjacent to the upright wall 62 and the gate is spaced horizontally from the packages 67 and 68 in the lowermost tier position 66. As a result, these packages are free to gravitate onto the convex bucket surface 103 between the receiving edge 110, which is adjacent to the wall 63, and the wall 62. In the second feeding disposition, the bucket is in a discharging position since the open side 105 of the bucket is downwardly disposed for dispensing any package within the bucket downwardly therefrom if this has not previously occurred in the cycle. In such second feeding disposition, the bucket and the gate are in a relative disposition, termed a "second relative disposition" in the claims, in which the bucket is in such a discharging position and the gate is in the feeding position 152 for movement of the entire stack 60 downwardly, as indicated by the arrow 200 in FIG. 5C, until the lowermost tier of packages in the stack rests on the convex surface and the bucket supports the stack for the time being. It is apparent that the convex surface is thus disposed beneath the lowermost tier position 66 to block movement of a package therefrom into the bucket.

As is apparent from FIGS. 3 and 5A through 5C, the packages 67 and 68 in the lowermost tier position 66 of the stack 60 are supported above the bucket 100 and the receiving edge 110 by the gate 120 until this edge is at substantially its highest position attained during the oscillating movement of the bucket. As a result, the stack is not lifted by movement of the bucket in a direction from its position 142 towards its position 141 even though the mechanism 50 is utilized with packages substantially smaller in diameter than the packages 54, thereby minimizing the power required to be provided by the motor unit 90 to motivate the bucket. This is in contrast to, as depicted in FIG. 1, the prior art mechanism in which the bucket thereof is always engaged by the packages in the stack thereabove and in which the stack must be lifted by the bucket to a greater or lesser extent dependent upon the package diameter for the bucket to move beyond its position relative to the stack shown in such figure. The power required by the motor unit is in any event reduced in relation to that required by prior art mechanisms by the fact that the stack does not engage the bucket during a substantial portion of the cycle of the mechanism thereby reducing friction between the bucket and the stack. It is evident from FIG. 5B that the receiving edge does not engage a package in the lowermost tier position 66, if this edge engages a package at all, until this edge is disposed to engage the package substantially tangentially therebeneath. As a result an edge of the bucket of the mechanism 50 embodying the principles of the subject invention does not engage a package, as occurs with prior art mechanisms and as depicted in FIG. 1, thereby preventing jamming and damage to packages due to such engagement.

Figure 5D:
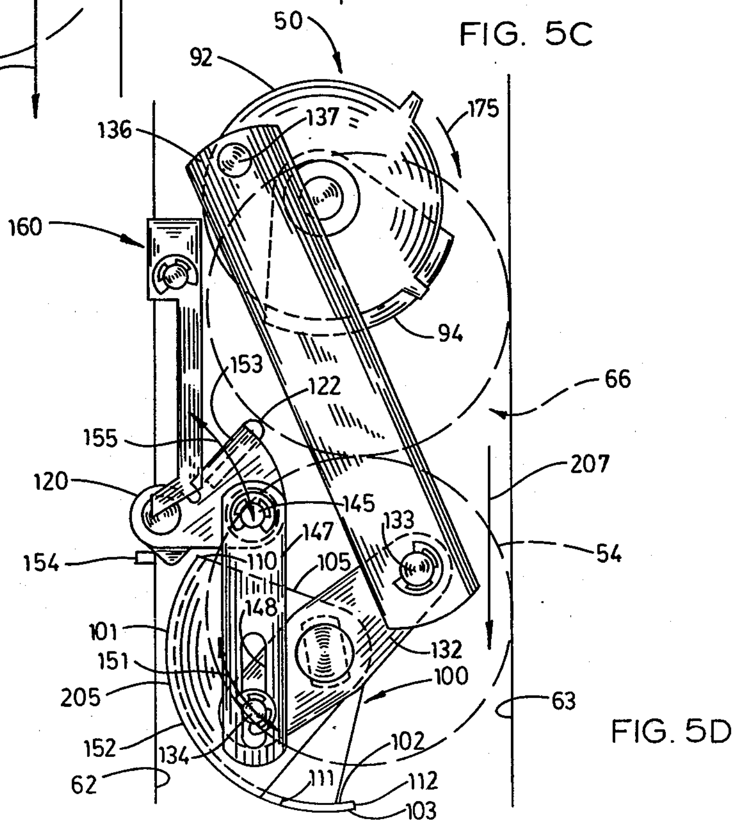

As the disk 92 continues to rotate, the mechanism 50 is motivated in its cycle from the second feeding disposition shown in FIG. 5C and approaches a third feeding disposition shown in FIG. 5D. As the mechanism moves from such second disposition, the linkage 130 begins to retrace its previously described movements pivoting the bucket 100 about the axis 83 into a receiving position 205 shown in FIG. 5D. In this position the open bucket side 105 is upwardly disposed and the receiving edge 110 is spaced from the bucket axis in a direction toward the upright wall 62 a distance generally equal to the radius of the packages 54, while the discharging edges 111 and 112 are spaced downwardly such a distance from the bucket axis and are again disposed centrally between the upright walls 62 and 63. The receiving edge is thus adjacent to the wall 62 and is spaced from the wall 63 a distance generally equal to the diameter of a package 54. As the receiving edge passes beneath the one of the tiers 64 which gravitated onto the convex surface 103 during the previous second feeding disposition, the two packages in this tier gravitate, as indicated by the arrow 207 in FIG. 5D, substantially simultaneously between the receiving edge 110 and the wall 63 and through the open bucket side 105 onto the concave surface 102 of the arcuate bucket plate 101 for subsequent discharge therefrom as the discharging edges 111 and 112 pass beneath such packages during the next cycle of the mechanism 50. Since the packages resting on the convex surface gravitate simultaneously onto the convex surface, it is evident that a jam, as occurs with the prior art mechanism and shown in FIG. 2C, due to successive movement of packages into an arcuate dispensing cannot occur with the mechanism 50 embodying the principles of the subject invention.

The gate 120, the crank pin 145, and the second connecting rod 147 remain in the positions corresponding to the second feeding disposition shown in FIG. 5C as the bucket 100 and the elements of the linkage 130 other than this rod begin to move from their positions in the second feeding disposition toward their positions in the third feeding disposition shown in FIG. 5D. This is due to the slot 148 which allows the crank pin 134 to move from the upper extreme position along its path 151 until this pin engages the lower end of the slot before the second connecting rod is urged downwardly and motivates the crank pin 145 from its upper extreme position along its path 155. The gate tends to gravitate from its feeding position 152 towards its blocking position 153 as soon as the crank pin 134 moves from its upper extreme position. However, as is apparent from FIG. 5C, the one of the tiers 64 then rested on the convex surface 103 blocks the gate from moving substantially from its feeding position. When the bucket subsequently attains its receiving position 205 and such tier gravitates into the bucket as shown in FIG. 5D, the gate gravitationally follows this tier, so that the distal edge 122 is engaged by another tier, the tier immediately upwardly of the tier gravitating into the bucket, and the gate moves into its blocking position to support such another tier in the lowermost tier position 66. The bucket and the gate are then in a disposition, termed a "third relative disposition" in the claims, in which the bucket is in the receiving position 205 and the gate is in the blocking position 153.

As the crank disk 92 continues to rotate from its position shown in FIG. 5C toward its position shown in FIG. 3, in which the mechanism 50 is in the initial disposition, the upper end of the slot 148 in the second connecting rod 147 engages the crank pin 134 causing the gate 120 to move into its blocking position 153 against the stop 154 if this movement is not complete for any reason. It is evident that the second connecting rod thus serves, not only to move the gate into the feeding position 152 from the blocking position as the bucket 100 moves from its second position 142 toward its first position 141, but to move the gate from the feeding position into the blocking position as the bucket moves from such first position towards such second position. When the crank disk is driven by the motor unit 90 to complete one revolution, the mechanism is returned to its initial disposition and the leading one of the narrow cam lobes 95 engages the switch 70 so that the control system of the machine 52 associated therewith deenergizes the motor unit until another cycle of the mechanism begins upon a subsequent vending initiation by such system.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A package dispensing mechanism for use in a vending machine adapted to contain an upright stack of packages and deliver the packages therein gravitationally and successively to the mechanism with the lowermost package in the stack disposed at a predetermined location, the packages having a maximum predetermined width transversely of the stack, and the mechanism comprising:

A. a gate disposed at such location;

B. means mounting the gate for movement between a blocking position, in which the gate is engaged with the lowermost package to block downward movement thereof, and a feeding position at one side of the stack in which the gate frees the lowermost package for downward movement;

C. a bucket having a side wall, which is generally arcuate about a predetermined axis, provides a concave surface, a convex surface and an open side disposed oppositely of the inner surface from such axis;

D. means mounting the bucket downwardly of the gate for pivotal movement about a bucket axis generally coincident with such predetermined axis and extended substantially horizontally beneath such predetermined location, the bucket being movable about the pivotal axis between a receiving position, in which such open side is upwardly disposed for reception of such lowermost package from the stack through the open side and onto the concave surface, and a discharging position in which the open side is downwardly disposed for dispensing a package downwardly from the concave surface and in which the convex surface is disposed beneath such predetermined location to block movement of a package therefrom into the bucket; and E. means for motivating the gate and the bucket sequentially and cyclically through (1) a first relative disposition in which the bucket is in the discharging position for release of a package previously received therein and the gate is in the blocking position so as to support the stack upwardly of the bucket, (2) a second relative disposition in which the bucket is in the discharging position and the gate is in the feeding position for movement of the stack downwardly until the lowermost package engages such concave surface, and (3) a third relative disposition in which the bucket is in the receiving position and the gate is in the blocking position so that, as the gate and the bucket move from the second disposition into the third disposition, the lowermost package is received from the balance of the stack onto the concave surface while the gate moves into the blocking position to engage the package immediately upwardly of such package.

2. The mechanism of claim 1, for use with such packages in which each has a generally cylindrical and substantially rigid exterior surface and in which such predetermined width is the diameter of such exterior surface and for use with such a vending machine in which the packages in the stack adjacent to such predetermined location are disposed in vertically engaging relation with their axes extending substantially horizontally and substantially along a common vertical plane, wherein such bucket axis is disposed substantially in said plane and wherein such side wall of the bucket has a radius equal to approximately one-half of such predetermined width.

3. The mechanism of claim 2 wherein the gate mounting means mounts the gate for pivotal movement between the blocking position and the feeding position about a gate axis, which is substantially parallel to the bucket axis and is disposed upwardly from the bucket axis generally said predetermined radius and is spaced horizontally from the bucket axis generally said predetermined radius, and mounts the gate for movement from the blocking position to the feeding position in a direction generally upwardly from the bucket axis and wherein the gate has a distal edge substantially parallel to the gate axis and spaced therefrom generally said predetermined radius so as to engage a package at such predetermined location in generally tangential relation when the gate is in the blocking position.

4. The mechanism of claim 3 wherein

A. such side wall of the bucket has a receiving edge extending generally parallel to the bucket axis and has an opposite discharging edge extending generally parallel to such axis, and B. the motivating means moves the bucket with an oscillating movement between said positions thereof and moves the bucket so that, when the bucket is in the receiving position, the receiving edge is spaced from the bucket axis generally such predetermined radius in a predetermined horizontal direction and the discharging edge is spaced downwardly from the bucket axis generally such predetermined radius and so that, when the bucket is in the discharging position, the receiving edge is spaced upwardly from the bucket axis generally such predetermined radius and the discharge edge is spaced from the bucket axis in such predetermined horizontal direction generally such predetermined radius.

5. A package dispensing mechanism for use in a vending machine to dispense sequentially from the machine a multiplicity of cylindrical packages which have a predetermined maximum radius and which are stored in the machine in a stack with the axes of the packages extended generally horizontally and substantially in a predetermined common upright plane, the stack having a plurality of tiers of the packages, each tier having a predetermined number of packages juxtapositioned in end-to-end and substantially axially coincident relation, and the mechanism comprising:

A. a plate having a length substantially equal to the length of a tier axially of the packages, the plate being configured transversely so as to provide a concave surface generally conforming to the periphery of the packages in a tier, and to provide a convex surface opposite the concave surface, the plate having a longitudinally extending receiving edge and having a number of discharging edges corresponding individually to the packages in a tier and extending longitudinally of the plate oppositely of the receiving edge, each discharging edge being spaced from the receiving edge a substantially different distance in a direction transversely of the plate;

B. means mounting the plate for oscillating pivotal movement between a first position and a second position about a plate axis, which is spaced from the concave surface oppositely of the convex surface a distance generally equal to such predetermined radius, and which extends substantially horizontally and substantially in such common plane, the plate being disposed in the first position so that each discharging edge is spaced such a distance horizontally from one side of said plane and the receiving edge is spaced such a distance upwardly of the plate axis and the plate being disposed in the second position so that the discharging edges are spaced such a distance downwardly of the plate axis and the receiving edge is spaced such a distance horizontally from said one side of said plane; and C. means for motivating the plate from the first position thereof toward the second position thereof with the lowermost tier of the stack rested on the convex surface so that, as the receiving edge passes beneath such tier, the packages therein substantially simultaneously gravitate onto the concave surface and for subsequently motivating the plate from the second position thereof toward the first position thereof so that, as the discharging edges pass beneath the corresponding packages on the concave surface, such packages are successively gravitationally dispensed from the plate.

6. The mechanism of claim 5 wherein such plate is arcuate, the radius of the concave surface being substantially equal to such maximum radius and the radius of the convex surface being somewhat greater than such radius, and wherein the receiving edge and each discharging edge are substantially linear.

7. The mechanism of claim 5 wherein the mechanism further comprises:

A. a gate substantially equal in length to such plate having a predetermined, longitudinally extending blocking edge;

B. means mounting the gate for movement about a gate axis extending substantially parallel to the plate axis so that the gate moves pivotally between a blocking position, in which the blocking edge is disposed above such plate when such plate is in the first position thereof for engagement by the blocking edge of the packages in the lowermost tier to support the stack upwardly of such plate, and a feeding position in which the gate is spaced horizontally from the lowermost tier for movement thereof into engagement with the convex surface when such plate is in the second position thereof; and C. means operatively connected to said motivating means for moving the gate into the blocking position from the feeding position as such plate moves from the first position thereof toward the second position thereof and for moving the gate into the feeding position from the blocking position as such plate moves into the first position thereof from the second position thereof.

8. The mechanism of claim 5 wherein the machine includes elements for initiating operation of such mechanism when each package from a tier thereof rested on the concave surface is to be gravitationally dispensed from such plate; wherein such plate has, along the movement thereof from the second position toward the first position, a number of intermediate positions corresponding individually to the discharge of the packages from such a tier; and wherein the means for motivating such plate comprises a power drive operable to drive the plate in movement through the intermediate positions and means receptive to said movement for interrupting the operation of the power drive as the plate attains one such intermediate position so that only the package corresponding to such one position is so discharged due to the immediately preceding initiation of the mechanism by said elements of the machine.

9. A package dispensing mechanism for use in a vending machine, the machine being adapted to initiate the individual vending at each of a multiplicity of substantially cylindrical and substantially rigid packages each having a predetermined length and a predetermined maximum radius and diameter, the packages being stored in the machine in a vertical stack of a plurality of tiers of the packages; each tier having a predetermined number of the packages disposed in end-to-end relation with the axes of the packages in the tier extending in substantially horizontally and substantially coincident relation; the machine having a pair of substantially parallel upright walls spaced a distance somewhat greater than such predetermined diameter; the stack being confined between such walls for gravitational movement of the tiers toward a lowermost tier position disposed at a predetermined elevation; and the mechanism comprising:

A. a bucket having
 (1) a predetermined pivotal axis;
 (2) an elongated and transversely curved plate having a length generally equal to the length of such a tier axially of the packages therein, providing a concave surface and an opposite convex surface which are arcuate substantially about said axis and which have a radius somewhat greater than such predetermined radius and less than such distance between such upright walls, having substantially linear discharging edges which are generally equal in length to the predetermined package length, which are disposed circumferentially oppositely of the plate from the receiving edge, which extend generally parallel thereto, and which are spaced substantially different distances from the receiving edge circumferentially of the plate;
 (3) an open side disposed oppositely of said axis from the plate between the receiving edge and the discharging edges, and
 (4) having a pair of bucket pivots extended along said axis and longitudinally oppositely from the plate;

B. a gate having a member providing a substantially linear blocking edge generally equal in length to the length of the receiving edge and having a pair of gate pivots extended oppositely of said member along an axis substantially parallel to the blocking edge and spaced therefrom a distance generally equal to such predetermined maximum radius;

C. means mounted on the upright walls for
 (1) receiving the bucket pivots with the receiving edge and the discharging edges disposed beneath such lowermost tier position and mounting the bucket for oscillating movement about a pivotal axis which is substantially coincident with such predetermined axis of the bucket, which extends substantially horizontally and, which is disposed centrally between such upright walls and is disposed downwardly of the lowermost tier position a distance at least equal to such maximum package radius; and
 (2) receiving the gate pivots with the blocking edge disposed generally parallel to the receiving edge and aligned therewith in a direction therealong and mounting the gate for pivotal movement about a gate axis is adjacent to one of such upright walls, is substantially parallel to the bucket axis, and is spaced upwardly therefrom a distance generally equal to such maximum radius; and D. powered means for motivating the bucket and the gate through a cycle of relative dispositions upon a number of successive package vending initiations by the machine equal in number to the number of packages in a tier, such dispositions including
 (1) an initial disposition which precedes the first such initiation, in which the gate is positioned with the blocking edge disposed centrally between the upright walls and upwardly of the gate axis to support upwardly of the bucket and on the blocking edge a tier in the lowermost tier position, and in which the bucket is positioned with discharging edges disposed centrally between the upright walls to support downwardly of the stack and on said concave surface all of the packages of a tier previously received from the lowermost tier position,
 (2) a discharging disposition which is subsequent to the first such initiation and prior to the second such initiation and in which the bucket is disposed, with only the one of the discharging edges closest to the receiving edge spaced from a first one of the upright walls a distance somewhat greater than said maximum diameter so that one such package supported on the concave surface is dispensed downwardly between said one of the discharging edges and said first wall as the bucket moves into its position corresponding to said discharging disposition,
 (3) a first feeding disposition which is subsequent to the first such initiation, in which the receiving edge is disposed centrally between the upright walls and beneath the lowermost tier position, and in which the gate remains with the blocking edge in supporting relation to a tier in said lowermost tier position so that such tier is supported by the gate upwardly of the bucket during the first feeding disposition,
 (4) a second feeding disposition which is subsequent to the first feeding disposition and to the final such initiation, in which the gate is disposed so that the blocking edge is adjacent to the one of the upright walls to which the gate axis is adjacent, and in which the bucket remains with the receiving edge disposed centrally between the upright walls so that the lowermost tier gravitates onto said convex surface between the receiving edge and said one of the upright walls,
 (5) a third feeding disposition which is subsequent to the second feeding disposition in which the bucket is disposed with the receiving edge adjacent to a second one of the upright walls opposite said first one thereof and the discharging edges are again disposed centrally between said walls so that the tier which previously gravitated onto the convex surface gravitates between the receiving edge and said first one of the walls onto the concave surface for subsequent discharge therefrom and in which the gate is disposed to pivot, as said tier gravitates onto the concave surface, so that the blocking edge moves from said one upright wall adjacent to the gate axis to a position centrally between the upright walls to support another tier in the lowermost tier position.

10. The mechanism of claim 9 wherein said powered means comprises

A. a crank assembly having a rotational axis disposed substantially parallel to the bucket axis and having a first crank pin which rotates through one revolution as the bucket and the gate undergo said cycle of relative dispositions, B. a second crank pin mounted on the bucket for oscillating movement therewith, C. a first connecting rod interconnecting the first and second crank pins so that the second crank pin is motivated by the crank assembly to oscillate between a pair of extreme positions corresponding individually to said initial disposition and to said second feeding disposition, D. A third crank pin mounted on the gate for pivotal movement with the gate in a path adjacent to the gate axis between an upper extreme position, when the gate is in a position thereof corresponding to said second feeding disposition, and a lower extreme position corresponding to the position of the gate in said initial disposition, E. a fourth crank pin mounted on the bucket for oscillating movement therewith in a path generally beneath said path of the third crank pin between an upper extreme position, which corresponds to the position of the bucket in said second feeding disposition, and a lower extreme position which corresponds to the position of the bucket in said initial disposition; and F. a second connecting rod interconnecting the third crank pin and the fourth crank pin for urging the third crank pin into the upper extreme position thereof as the fourth crank attains the upper extreme position, said rod being slotted at one of said crank pins in a direction therebetween so that the third crank pin is not urged from its upper extreme position as the fourth crank pin initially moves from its upper extreme position and so that the gate does not move from the position thereof corresponding to the second feeding disposition as the bucket oscillates from the position thereof in said secondary feeding disposition.

11. The mechanism of claim 10 further comprising:

A. a latch lever extending from the third crank pin in a direction generally oppositely of the fourth crank pin, said lever having a distal end adjacent to the third crank pin and an opposite end mounted on the upright walls for pivotal movement of the distal end toward the third crank pin into engagement therewith to latch the third crank pin in the lower extreme position and maintain the gate in the position thereof corresponding to said initial disposition and for movement from such engagement, and B. cam means for rotating with the crank assembly and for pivoting the latch lever into such engagement when the crank assembly is in its rotational positions corresponding to said initial disposition and said discharging disposition and for pivoting the latch lever from said engagement during the balance of said cycle so that the gate is latched in the position thereof corresponding to said dispositions prior to the final package vending initiation of said cycle.

* * * * *